United States Patent
Gros et al.

(10) Patent No.: US 10,618,168 B2
(45) Date of Patent: Apr. 14, 2020

(54) ROBOT SYSTEM PATH PLANNING FOR ASSET HEALTH MANAGEMENT

(71) Applicant: General Electric Company, Schenectady, NY (US)

(72) Inventors: Eric Michael Gros, Milwaukee, WI (US); Huan Tan, Clifton Park, NY (US); Mauricio Castillo-Effen, Rexford, NY (US); Charles Burton Theurer, Alplaus, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 311 days.

(21) Appl. No.: 15/473,345

(22) Filed: Mar. 29, 2017

(65) Prior Publication Data
US 2017/0326729 A1 Nov. 16, 2017

Related U.S. Application Data

(60) Provisional application No. 62/343,615, filed on May 31, 2016, provisional application No. 62/336,332, filed on May 13, 2016.

(51) Int. Cl.
*B25J 9/16* (2006.01)
*G05D 1/10* (2006.01)
(Continued)

(52) U.S. Cl.
CPC ............ *B25J 9/1661* (2013.01); *B25J 9/163* (2013.01); *B25J 9/1664* (2013.01); *B25J 9/1671* (2013.01);
(Continued)

(58) Field of Classification Search
CPC ........ B25J 9/1602; B25J 9/163; B25J 9/1661; B25J 9/1664; B25J 9/1671; B25J 9/1697;
(Continued)

(56) References Cited

U.S. PATENT DOCUMENTS

| 5,947,051 A | 9/1999 | Geiger |
| 6,425,865 B1 * | 7/2002 | Salcudean ............ A61B 8/0875 600/111 |

(Continued)

FOREIGN PATENT DOCUMENTS

| CN | 201828247 U | 5/2011 |
| CN | 105154870 A | 12/2015 |

(Continued)

OTHER PUBLICATIONS

Hunt et al., "3D printing with flying robots", 2014 IEEE International Conference on Robotics and Automation (ICRA), pp. 4493-4499, May 31, 2014-Jun. 7, 2014, Hong Kong.
(Continued)

*Primary Examiner* — Robert T Nguyen
(74) *Attorney, Agent, or Firm* — Fletcher Yoder, P.C.

(57) ABSTRACT

A robotic system includes a processing system comprising at least one processor. The processor generates a plan to monitor the asset. The plan comprises one or more tasks to be performed by the at least one robot. The processor receives sensor data from at least one sensor indicating one or more characteristics of the asset. The processor adjusts the plan to monitor the asset by adjusting or adding one or more tasks to the plan based on one or both of the quality of the acquired data or a potential defect of the asset. The adjusted plan causes the at least one robot to acquire additional data related to the asset when executed.

18 Claims, 4 Drawing Sheets

(51) Int. Cl.

| | |
|---|---|
| *G06Q 10/08* | (2012.01) |
| *G05D 1/00* | (2006.01) |
| *G05B 19/042* | (2006.01) |
| *F22B 37/00* | (2006.01) |
| *F01D 5/00* | (2006.01) |
| *G05B 19/048* | (2006.01) |
| *G05B 19/4097* | (2006.01) |
| *G05B 19/4065* | (2006.01) |

(52) U.S. Cl.
CPC ............ *B25J 9/1697* (2013.01); *F01D 5/005* (2013.01); *F22B 37/00* (2013.01); *G05B 19/042* (2013.01); *G05B 19/048* (2013.01); *G05B 19/4065* (2013.01); *G05B 19/4097* (2013.01); *G05D 1/0094* (2013.01); *G06Q 10/08* (2013.01); *B25J 9/1602* (2013.01); *G05B 2219/35134* (2013.01); *G05B 2219/40323* (2013.01); *G05B 2219/42329* (2013.01); *G05B 2219/49007* (2013.01); *G05D 1/101* (2013.01); *Y02P 90/083* (2015.11); *Y10S 901/01* (2013.01); *Y10S 901/44* (2013.01)

(58) Field of Classification Search
CPC ................ G05B 19/042; G05B 19/048; G05B 19/4065; G05B 19/4097; G05B 2219/35134; G05B 2219/40323; G05B 2219/42329; G05B 2219/49007; G05D 1/0094; G05D 1/101; Y10S 901/01; Y10S 901/44; F01D 5/005; F22B 37/00; G06Q 10/08; Y02P 90/083
See application file for complete search history.

(56) References Cited

U.S. PATENT DOCUMENTS

| | | | |
|---|---|---|---|
| 8,070,473 B2 | 12/2011 | Kozlak | |
| 8,666,553 B2 | 3/2014 | Phillips et al. | |
| 8,833,169 B2 | 9/2014 | Lute, Jr. et al. | |
| 9,183,527 B1 | 11/2015 | Close et al. | |
| 9,193,068 B2 | 11/2015 | Chin et al. | |
| 9,193,402 B2 | 11/2015 | Chin et al. | |
| 9,665,843 B2 | 5/2017 | Smiley et al. | |
| 10,417,076 B2 | 9/2019 | Ciasulli et al. | |
| 2003/0139836 A1 | 7/2003 | Matthews et al. | |
| 2006/0290779 A1 | 12/2006 | Reverte et al. | |
| 2007/0094268 A1 | 4/2007 | Tabe | |
| 2010/0049367 A1* | 2/2010 | Yang | E01D 19/106 700/259 |
| 2010/0076631 A1 | 3/2010 | Main | |
| 2010/0030378 A1 | 4/2010 | Choi et al. | |
| 2010/0215212 A1 | 8/2010 | Flakes, Jr. | |
| 2010/0235037 A1 | 9/2010 | Vian et al. | |
| 2012/0261144 A1 | 10/2012 | Vian et al. | |
| 2013/0015596 A1 | 1/2013 | Mozeika et al. | |
| 2014/0336928 A1 | 11/2014 | Scott | |
| 2015/0097084 A1 | 4/2015 | Szabo et al. | |
| 2015/0148949 A1* | 5/2015 | Chin | G05D 1/0246 700/245 |
| 2015/0149392 A1 | 5/2015 | Bolich | |
| 2016/0059489 A1 | 3/2016 | Wang et al. | |
| 2016/0078695 A1 | 3/2016 | McClintic et al. | |
| 2016/0249021 A1 | 8/2016 | McAleenan et al. | |
| 2017/0045895 A1* | 2/2017 | Wang | G05D 1/101 |
| 2017/0225400 A1 | 8/2017 | Lee et al. | |
| 2017/0308088 A1* | 10/2017 | Sabe | G01C 11/025 |
| 2017/0345317 A1 | 11/2017 | Heinonen et al. | |
| 2018/0128657 A1* | 5/2018 | Crothers | G01D 11/30 |
| 2019/0094887 A1* | 3/2019 | Di | B64C 39/024 |

FOREIGN PATENT DOCUMENTS

| | | |
|---|---|---|
| CN | 105171742 A | 12/2015 |
| WO | 2013157978 A1 | 10/2013 |
| WO | 2015073322 A1 | 5/2015 |

OTHER PUBLICATIONS

Celi et al., "Study, design and construction of a 3D printer implemented through a delta robot", 2015 Chilean Conference on Electrical, Electronics Engineering, Information and Communication Technologies (CHILECON), pp. 717-722, Oct. 28-30, 2015, Santiago.

Wang et al., "Robotics-driven printing of curved 3D structures for manufacturing cardiac therapeutic devices", 2015 IEEE International Conference on Robotics and Biomimetics (ROBIO), pp. 2318-2323, Dec. 6-9, 2015, Zhuhai.

Rehnmark, Fredrik, et al.; "Innovative Robot Archetypes for In-Space Construction and Maintenance", NASA Technical Reports Server (NTRS), Jan. 1, 2005, 8 pages.

Kyrkjebo, Erik, et al.; "A Robotic Concept for Remote Inspection and Maintenance on Oil Platforms", ASME 2009 28th International Conference on Ocean, Offshore and Arctic Engineering, May 31-Jun. 5, 2009, vol. 1, pp. 667-674.

Heyer, Clint; "Human-Robot Interaction and Future Industrial Robotics Applications", International Conference on Intelligent Robots and Systems, Oct. 18-22, 2010, Taipei, Taiwan, pp. 4749-4754.

Transeth, Aksel A., et al.; "A Robotic Concept for Remote Maintenance Operations: A Robust 3D Object Detection and Pose Estimation Method and a Novel Robot Tool", International Conference on Intelligent Robots and Systems, Oct. 18-22, 2010, Taipei, Taiwan, pp. 5099-5106.

\* cited by examiner

ROBOT SYSTEM PATH PLANNING FOR ASSET HEALTH MANAGEMENT

CROSS-REFERENCE TO RELATED APPLICATIONS

This application claims priority to U.S. Provisional Patent Application No. 62/343,615, entitled "ROBOT SYSTEM FOR ASSET HEALTH MANAGEMENT", filed May 31, 2016, and U.S. Provisional Patent Application No. 62/336,332, entitled "ROBOT SYSTEM FOR ASSET HEALTH MANAGEMENT", filed May 13, 2016, which are both herein incorporated by reference in their entirety for all purposes.

BACKGROUND

The subject matter disclosed herein relates to asset management, and more particularly, to monitoring and managing health of an asset using a robotic system.

Various entities may own or maintain various types of assets as part of their operation. Such assets may include physical or mechanical devices or structures, which may in some instances, have electrical and/or chemical aspects as well. Such assets may be used or maintained for a variety of purposes and may be characterized as capital infrastructure, inventory, or by other nomenclature depending on the context. For example, assets may include distributed assets, such as a pipeline or an electrical grid, as well as individual or discrete assets, such as an airplane, a tower, or a vehicle. Assets may be subject to various types of defects (e.g., spontaneous mechanical defects, electrical defects as well as routine wear-and-tear) that may impact their operation. For example, over time, the asset may undergo corrosion or cracking due to weather or may exhibit deteriorating performance or efficiency due to the wear or failure of component parts.

Typically, one or more human inspectors may inspect, maintain, and repair the asset. For example, the inspector may locate corrosion on the asset and clean the corrosion from the asset. However, depending on the location, size, and/or complexity of the asset, having one or more human inspectors performing inspection of the asset may take away time for the inspectors to perform other tasks. Additionally, some inspection tasks may be dull, dirty, or may be otherwise unsuitable for a human to perform. For instance, some assets may have locations that may not be accessible to humans due to height, confined spaces, or the like. Further, inspections may be performed at times based on schedules resulting in either over-inspection or under-inspection. Accordingly, improved systems and techniques for managing the health of various types of assets are desirable.

BRIEF DESCRIPTION

In a first embodiment, a robotic system configured to monitor an asset includes at least one robot comprising at least one sensor capable of detecting one or more characteristics of an asset and at least one effector capable of performing a repair or maintenance operation on the asset, and a processing system comprising at least one processor operatively coupled to at least one memory, wherein the processor is configured to generate a plan to monitor the asset, wherein the plan comprises one or more tasks to be performed by the at least one robot, receive sensor data from the at least one sensor indicating one or more characteristics of the asset, and adjust the plan to monitor the asset by adjusting or adding one or more tasks to the plan based on one or both of the quality of the acquired data or a potential defect of the asset, or wherein the adjusted plan causes the at least one robot to acquire additional data related to the asset when executed.

In a second embodiment, a method includes generating a plan to monitor an asset for defects, wherein the plan comprises one or more tasks to be performed by an at least one robot via an at least one effector of the at least one robot, acquiring sensor data from at least one sensor of the at least one robot indicating one or more characteristics of the asset, and generating a signal encoding or conveying instructions to control the at least one robot to address a defect of the asset identified from the sensor data.

In a third embodiment, a non-transitory, computer readable medium includes instructions configured to be executed by a processor of a robotic system, wherein the instructions include instructions configured to cause the processor to generate a plan to monitor an asset for defects, wherein the plan comprises one or more tasks to be performed by an at least one robot via an at least one effector of the at least one robot, acquire sensor data from an at least one sensor of the at least one robot indicating one or more characteristics of the asset, and generate a signal, encoding or conveying, instructions to control the at least one robot to address quality of the acquired sensor data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
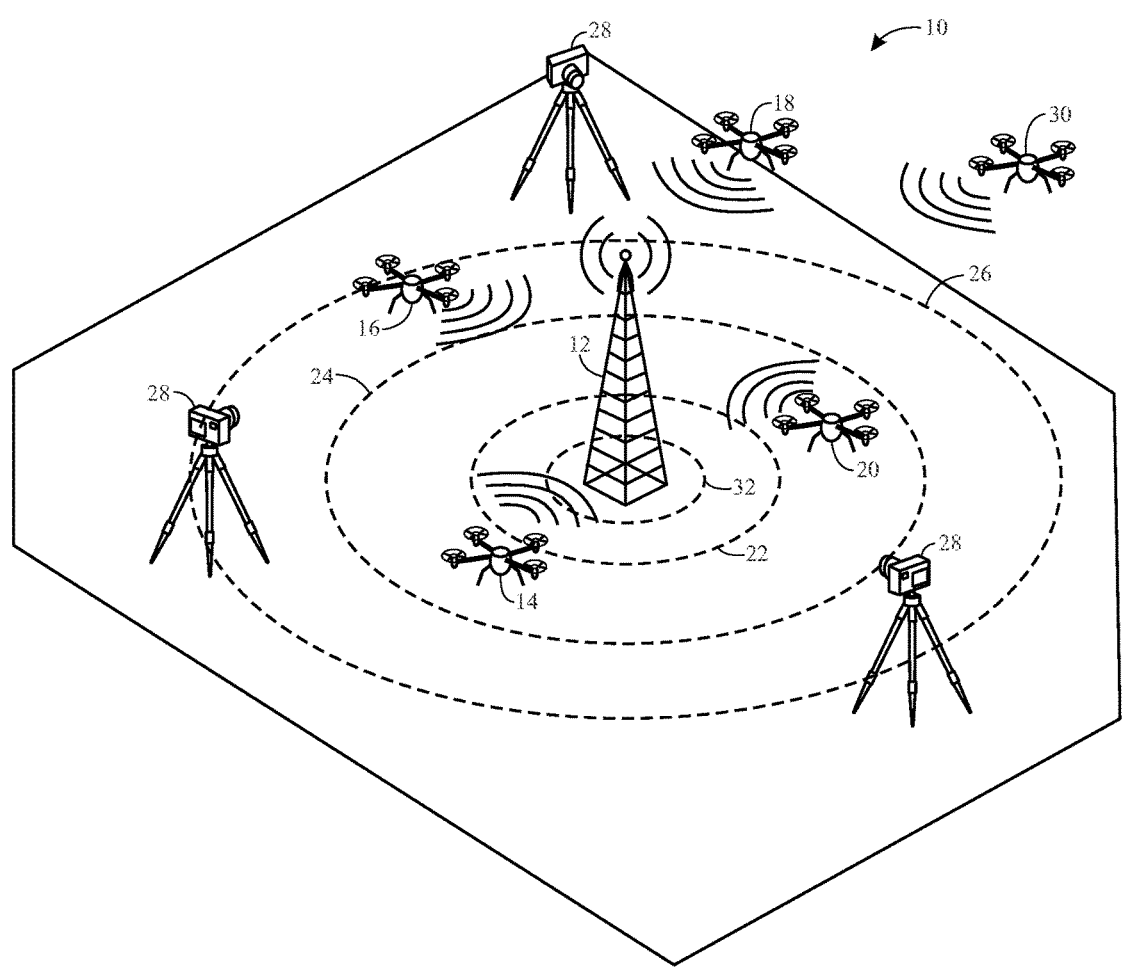
FIG. 1 is a perspective view of a robotic system with a set of robots to monitor and manage the health of an asset, in accordance with aspects of the present disclosure.

The subject matter disclosed herein relates to managing repair and/or maintenance of an asset with a robotic system. Such an approach may be useful in monitoring or repairing assets associated with various entities, including business or corporate entities, governments, individuals, non-profit organizations, and so forth. As discussed herein, such assets may be generally discrete or limited in their extent (e.g., a vehicle such as a plane, helicopter, ship, submersible, space launch vehicle, satellite, locomotive, and so forth) or may be geographically distributed (e.g., a road or rail track, a port or airport, a pipeline or electrical infrastructure, a power generation facility or manufacturing plant, and so forth). The present approach as described herein may be used to monitor and maintain assets of these types (as well as others not listed) in an autonomous or semi-autonomous manner using robotic intermediaries. As discussed herein, the robotic intermediaries may be used to facilitate one or both of health monitoring of the asset and repair, remediation, or improvement of the asset with limited or no human support.

With this in mind, it will be appreciated that in a variety of fields, assets, such as distributed assets and/or individual assets may be used to perform any number of operations. Over time, assets may deteriorate due to weather, physical wear, or the like. For example, over months or years, one or more components of an asset may wear or deteriorate due to rain and wind or other environmental conditions or due to inadequate maintenance. Alternatively, in some instances, spontaneous failures of one or more components or systems of an asset may occur which may be unrelated to wear or maintenance conditions but may instead be attributable to an undetected defect or an unknown stressor. Regardless of whether an asset defect is due to gradual process or a sudden occurrence, the health of the asset depends on identifying and addressing such defects in a timely and effective manner.

In conventional approaches, one or more human agents (e.g., field engineers, operators, or other users of the asset) may inspect the asset for wear at limited intervals to maintain health of the asset and/or to replace parts that appear worn. However, the human agents may be unable to inspect components or locations that may not be easily accessible to humans, such as below the waterline of a marine asset, within a tank or pipe of a pipeline or storage facility, on the exterior surfaces or components of a vehicle in motion (such as a flying plane or helicopter, a moving truck or locomotive), and so forth). Further, when defects are located, for some assets human-based repair may require taking the asset out of operation to implement a repair. As such, it is desirable to find improved ways to monitor and maintain various assets.

With the preceding in mind, in certain embodiments disclosed herein, a robot system may be used to monitor and manage health of an asset that reduces or eliminates human intervention. A robot may be a machine (e.g., electromechanical) capable of carrying out a set of tasks (e.g., movement of all or part of the machine, operation of one or more type of sensors to acquire sensed data or measurements, and so forth) automatically (e.g., at least partially without input, oversight, or control by a user), such as a set of tasks programmed by a computer. For example, the robot may include one or more sensors to detect one or more characteristics of an asset and one or more effectors to perform an operation based on a plan to assess the asset. The robot system may include a processing system that includes one or more processors operatively coupled to memory and storage components. While this may be conceptualized and described below in the context of a single processor-based system to simplify explanation, the overall processing system used in implementing an asset management system as discussed herein may be distributed throughout the robotic system and/or implemented as a centralized control system. With this in mind, the processor may be configured to generate a plan to assess the asset for defects. For example, the processor may determine the plan based on the tasks (e.g., desired inspection coverage of the asset) and/or resources (e.g., robots) available. Based on the generated plan, the processor may implement the plan by sending signal(s) to the robots providing instructions to perform the tasks defined in the plan. A controller of each robot may process any received instructions and in turn send signal(s) to one or more effectors controlled by the respective robot to control operation of the robot to perform the assigned tasks.

The processor may determine a plan to monitor the asset. The plan may include one or more tasks to be performed by one or more robots of the robotic system. Further, the processor may adjust (e.g., revise) the plan based on the data received from the sensors related to the asset. For example, the plan may be adjusted based on acquired data indicative of a potential defect of the asset. The processor may send a signal(s) encoding or conveying instructions to travel a specified distance and/or direction that enables the robot to acquire additional data related to the asset associated with the potential defect.

Upon performing the assigned tasks, the processor may assess the quality of data received from the sensors. Due to a variety of factors, the quality of the data may be below a threshold level of quality. For example, pressure sensors or acoustic sensors may have background noise due to the conditions proximate to the asset. As such, the processor may determine a signal-to-noise ratio of the signals from the sensors that indicates a relationship between a desired signal and background noise. If the processor determines that the signal-to-noise ratio falls below a threshold level of quality, the processor may adapt the plan to acquire additional data. If the processor determines that the signal-to-noise ratio is above a threshold level of quality, the processor may proceed to perform maintenance actions based on the sensor data.

In certain embodiments, to perform maintenance actions, the processor may generate, maintain, and update a digital representation of the asset based on one or more characteristics that may be monitored using robot intermediaries and/or derived from known operating specifications. For example, the processor may create a digital representation that includes, among other aspects, a 3D structural model of the asset (which may include separately modeling components of the asset as well as the asset as a whole). Such a structural model may include material data for one or more components, lifespan and/or workload data derived from specifications and/or sensor data, and so forth. The digital representation, in some implementations may also include operational or functional models of the asset, such as flow models, pressure models, temperature models, acoustic models, lifting models, and so forth. Further, the digital representation may incorporate or separately model environmental factors relevant to the asset, such as environmental temperature, humidity, pressure (such as in the context of a submersible asset, airborne asset, or space-based asset). As part of maintaining and updating the digital representation, one or more defects in the asset as a whole or components of the asset may also be modeled based on sensor data communicated to the processing components.

Depending on the characteristics of the structural model, the processor may generate a plan specifying one or more tasks or action, such as acquiring additional data related to the asset. For example, if the processor determines that acquired data of a location on the structural model is below a threshold quality or is otherwise insufficient, the processor may generate or update a revised plan that includes one or more tasks that position the robot to acquire additional data regarding the location.

The sensor data used to generate, maintain, and update the digital representation, including modeling of defects, may be derived from sensor data collected using one or more of sensors mounted on robots controlled by the processing components and/or by sensors integral to the asset itself which communicate their sensor data to the processing components. As used herein, the robots used to collect sensor data, as well as effect repairs, may be autonomous and capable of movement and orientation in one—(such as along a track), two—(such as along connected roads or along a generally planar surface), or three-dimensions (such as three-dimensional movement within a body of water, air, or space). The sensors used to collect the sensor data may vary between robots and/or may be interchangeable so as to allow customization of robots depending on need. Example of sensors include, but are not limited to, cameras or visual sensors capable of imaging in one or more of visible, low-light, ultraviolet, and or infrared (i.e., thermal) contexts, thermistors or other temperature sensors, material and electrical sensors, pressure sensors, acoustic sensors, radiation sensors or imagers, probes that apply non-destructive testing technology, and so forth. With respect to probes, for example, the robot may contact or interact physically with the asset to acquire data.

The digital representation may incorporate or be updated based on a combination of factors detected from one or more sensors on the robot (or integral to the asset itself). For instance, the processor may receive visual image data from image sensors (e.g., cameras) on the robots to create or update a 3D model of the asset to localize defects on the 3D model. Based on the sensor data, as incorporated into the 3D model, the processor may detect a defect, such as a crack, a region of corrosion, or missing part, of the asset. For example, the processor may detect a crack on a location of a vehicle based on visual image data that includes color and/or depth information indicative of the crack. The 3D model may additionally be used as a basis for modeling other layers of information related to the asset. Further, the processor may determine risk associated with a potential or imminent defect based on the digital representation. Depending on the risk and a severity of the defect, the processor, as described above, may send signal(s) to the robots indicating instructions to repair or otherwise address a present or pending defect. For example, the defect may be addressed (e.g., repaired, remediated, or otherwise prevented) via additive manufacturing (e.g., printing a 3D printable part to be attached to or integrated with the asset as part of a repair process), spraying a part of the asset with a preventative or treatment composition (e.g., with a lubricant or spray paint), welding a part of the asset, replacing a part of the asset from an available inventory of parts, displaying instructions to an operator to repair the defect, or any other suitable method of addressing the defect.

With the preceding introductory comments in mind, FIG. 1 shows a perspective view of a robotic system 10 that manages health of an asset 12 by inspecting and/or repairing the asset 12. The robotic system 10 may include a fleet of robots, such as drones (capable of autonomous movement in one-, two-, or three-dimensions, including movement with or without an attached electrical and/or data tether), machines, computing systems, and so forth. Each of the robots may receive data via sensors and/or may control operation of one or more effectors of the robot. In the illustrated embodiment, the robotic system 10 includes robots, such as drones, that each have red-green-blue (RGB) sensors, such as cameras, image sensors, photodiodes, or the like, to generate signals indicating characteristics of the asset 12 when the RGB sensor is directed toward the asset. In the present disclosure, the drones with RGB sensors are referred to as a first red-green-blue (RGB) drone 14, a second RGB drone 16, and a third RGB drone 18. Alternatively, the drones may be referred to more generally as robots. The first RGB drone 14, the second RGB drone 16, and the third RGB drone 18 may receive signals indicative of colors of an exterior of the asset 12. Further, the robotic system 10 includes may include a drone having an infrared (IR) camera, referred to as an IR drone 20. While the robotic system 10 of the illustrated embodiment includes drones, any suitable robot that operates at least partially autonomous (e.g., without input from an occupant within the vehicle) may be included in the robotic system 10, such as unmanned aerial vehicles, unmanned ground vehicles (e.g., autonomous trucks or locomotives), unmanned underwater or surface water vehicles, unmanned space vehicles, crawling robots, or a combination thereof. Further, the robots may operate in one dimension, two dimensions, or three dimensions. While the illustrated embodiment includes four drones, this is meant to be an example, and any suitable number of any suitable number and types of robots (e.g., drones) may be employed. Additionally and/or alternatively, the robots may include drones that are manually guided by an operator. For example, the operator may have a remote control that sends signal(s) to the manually guided drone to control a location and/or orientation of the drone.

In some embodiments, it may be desirable to have robots that move (autonomously or under direction) to various positions proximate to the asset 12 to acquire sensor data describing one or more characteristics of the asset from different perspectives with respect to the asset 12. For example, the RGB drones 14, 16, and 18 may move with respect to the asset 12 to receive signal(s) from the RGB sensors indicating the characteristics of the asset 12. That is, the drones 14, 16, and 18 may fly in an at least partially autonomous manner. For instance, the drones 14, 16, and 18 may obtain instructions to control a propeller or wings of the respective drones to adjust the position of the drone with respect to the asset such that the respective drone 14, 16, and 18 may acquire additional characteristics of the asset 12 from another perspective. In some embodiments, the instructions may be received from a control system or the instructions may be stored on memory of the RGB drones 14, 16, and 18. For example, the instructions may instruct each of the RGB drones 14, 16, and 18 to capture images at regular intervals in a flight path with respect to the asset 12 with or without continuous communication and instruction from a separate controller (e.g., a centralized controller). For example, each of the RGB drones 14, 16, and 18 may move along a respective path 22, 24, and 26 that orbits the asset 12 and/or directs the RGB sensors towards the asset 12. Similarly, the IR drone 20 may move along a path 20 that orbits the asset and/or directs the IR sensor towards to asset 12 to enable the IR drone 20 to capture infrared data indicating depth information of the asset 12.

The robotic system 10 may be self-organizing in which tasks are allocated to various members of a multi-robot team based on each of the robots capabilities. For example, a control system may include a controller that acquires a list of robots with each capability of each robot. The controller may determine task assignments of each robot based on the respective capabilities of each robot. For example, a light drone having more flight endurance may be assigned by the controller to perform rough identification of anomalies. Another drone carrying a high resolution camera having less flight time may be assigned by the controller to move to specific locations to capture high resolution imagery. The controller may send signal(s) to each of the drones indicating instructions to perform the assigned tasks based on the capabilities of each robot.

Moreover, the robotic system 10 may include inspection systems 28 (e.g., video cameras) positioned in locations proximate to the asset 12 to acquire various characteristics of the asset 12. Such positioned systems, unlike the drones described above, may be stationary or have limited movement from a fixed position, such as being mounted on a remotely controlled moveable arm or having pan, tilt, zoom functionality. For example, the inspection systems may acquire color and/or depth information related to the asset 12 as well as acquire information related to the process performed by the drones 14, 16, 18, and 20, such as flight path information with respect to the asset 12, flight path information with respect to each other, altitude information, or the like. Similarly, the robotic system 10 may include a manually controlled drone 30 to acquire various characteristics of the asset 12, similar to those described above regarding the autonomous RGB and IR drones 14, 16, 18, and 20.

Figure 2:
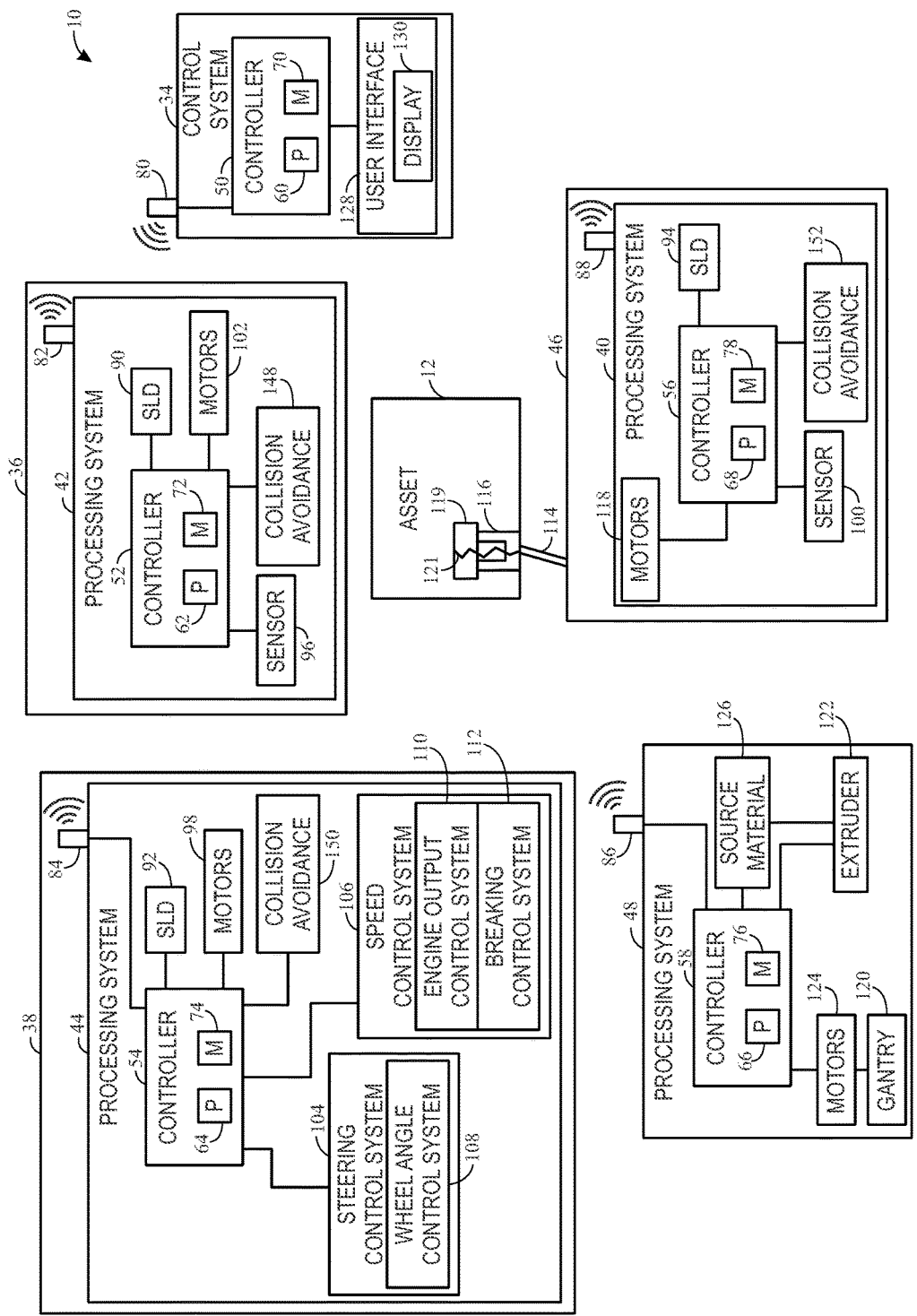
FIG. 2 is a block diagram of the robotic system of FIG. 1 having a second set of robots to manage another asset with a control system, in accordance with aspects of the present disclosure.

The robotic system 10 may plan a mission to inspect the asset and analyze data from the inspection to find one or more defects. Such a plan may be generated based on available inspection and/or repair assets (e.g., what robots are available having what sensing modalities or which can be outfitted with what sensing modalities, what robots are available having what repair modalities, and stationary or integral sensor data is available for the asset, and so forth) as well as on the age and/or inspection and repair history of the asset. FIG. 2 is a block diagram of the robotic system 10 having a second set of robots that each include one or more sensors and one or more effectors. In the illustrated embodiment, the robotic system 10 includes a control system 34, a first robot 36, a second robot 38, a third robot 40, and a three dimensional (3D) printer. Further, in the example shown in FIG. 2, the first robot 36 may be an RGB drone, the second robot 38 may be an autonomous vehicle, and the third robot 40 may be a manipulator system. While the robotic system 10 includes an RGB drone, an autonomous vehicle, and a manipulator system, the robots used in FIG. 2 are simply meant to be an example, and any robots (e.g., crawling robot, underwater robot, manually controlled robot, etc.) suitable may be included. The robots 36, 38, and 40 include a first processing system 42, a second processing system 44, and a third processing system 46, respectively. While the robotic system 10 may include the centralized control system 34 as shown in FIG. 2, in other embodiments, parts of the planning and/or control may be distributed to each of the processing systems of the robotic system 10. Further, while three processing systems are shown, it should be appreciated that any suitable number of processing systems may be used.

In the illustrated embodiment, the control system 34, the first processing system 42, the second processing system 44, the third processing system 46 and the 3D printer 48 each include a controller 50, 52, 54, 56, and 58, respectively. Each controller 50, 52, 54, 56, and 58 includes a processor 60, 62, 64, 66, and 68, respectively. The controllers 50, 52, 54, 56, and 58 may also include one or more storage devices and/or other suitable components, such as the memory devices 70, 72, 74, 76, and 78, respectively, operatively coupled to the processors 60, 62, 64, 66, and 68, respectively, to execute software, such as software for controlling the vehicles (e.g., drones, autonomous vehicles, etc.), detecting defects of the asset 12, repairing and/or maintaining the asset 12, and so forth. Moreover, the processors 60, 62, 64, 66, and 68 may each include multiple processors, one or more "general-purpose" microprocessors, one or more special-purpose microprocessors, and/or one or more application specific integrated circuits (ASICS), or some combination thereof. For example, each processor 60, 62, 64, 66, and 68 may include one or more reduced instruction set (RISC) processors.

Each memory device 70, 72, 74, 76, and 78 may include a volatile memory, such as random access memory (RAM), and/or a nonvolatile memory, such as read-only memory (ROM). Each memory device 70, 72, 74, 76, and 78 may store a variety of information that may be used for various purposes. For example, each memory device 70, 72, 74, 76, and 78 may store processor-executable instructions (e.g., firmware or software) for the respective processors 60, 62, 64, 66, and 68 to execute, such as instructions for controlling the vehicles (e.g., drones, autonomous vehicles, etc.), detecting defects of the asset 12, repairing and/or maintaining the asset 12, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., planned flight paths, sensor data, etc.), the model of the asset used for health management, instructions (e.g., software or firmware for controlling the vehicle, etc.), and any other suitable data.

Further, the control system 34, the first processing system 42, the second processing system 44, the third processing system 46 and the 3D printer 48 may each include a radio frequency (RF) antenna 80, 82, 84, 86, and 88, respectively, to communicate with each other. Each of the controllers 50, 52, 54, 56, and 58 may communicate using any suitable standard, such as WiFi (e.g., IEEE 802.11), ZigBee (e.g., IEEE 802.15.4), or Bluetooth, among others. For example, the first processing system 42 of the RGB drone 36 may send signal(s), via the antenna 82, to the antenna 80 of the control system 34 indicative of a position of the RGB drone 36. The control system 34 may send signal(s), via the antenna 80, to the antenna 82 of the first processing system 42 of the RGB drone 36 indicative of instructions to control the RGB drone 36 based on the position of the RGB drone 36. For instance, each of the controllers 50, 52, 54, 56, and 58 may communicate with each other to synchronize inspection of the asset 12. That is, the flight patterns (e.g., direction, distance, and timing) of drones may be synchronized with one another to prevent drones from interfering with one another while inspecting the asset 12.

Each of the processing systems 42, 44, and 46 may include spatial locating devices 90, 92, and 94, respectively, which are each mounted to the respective robot, and configured to determine a position of the drone 36, the autonomous vehicle 38, and the ground robot 40, respectively. As will be appreciated, the spatial locating devices 90, 92, and 94 may include any suitable system configured to determine the position of the drone 36, the autonomous vehicle 38, and the ground robot 40, respectively, such as global positioning system (GPS) receivers, for example. In certain embodiments, the processing systems 42, 44, and 46 may receive signal(s) via one or more sensors 96, 98, and 100, respectively, indicative of visual inputs of the environment. Each of the respective processors 62, 64, and 68 may generate a map of the environment and localize the respective robot 36, 38, or 40 within the map. Further, localization may include an absolute position (e.g., fixed global coordinate system or fixed local coordinate system) as well as position in relation to the asset (e.g., orientation, distance, etc.).

Each of the processing systems 42, 44, and 46 may include one or more sensors 96, 98, and 100 that send signal(s) to the respective controllers 52, 54, and 56 to facilitate control of the respective robots 36, 38, and 40 as well as to acquire data indicative of various properties of the asset 12. The sensors 96, 98, 100 may include infrared sensors, ultrasonic sensors, magnetic sensors, thermal sensors, radiation detection sensors, imaging sensors (e.g., RGB sensors), Light Detection and Ranging (LIDAR) sensors, or the like. Further, each robot 36, 38, and 40 may include one or more types of sensors.

Moreover, each of the robots 36, 38, and 40 may include one or more effectors, such as actuators, motors, or other controls. For example, the robot 36 may include one or more motors 102 that control operation of the robot 36. Each of the robots 36, 38, and 40 may be self-powered (e.g., an engine and/or battery) and/or receive power from another power source (e.g., via a power tether). Further, the controller 52 may send signal(s) to the motors 102 of the robot 36 to control a speed of the rotor of the motor 102, thereby controlling the position of the robot 36. For example, the controller may send signal(s) indicating instructions to increase or decrease speed of one or more of the rotors of the motors 102 to adjust yaw, pitch, roll, or altitude, of the robot 36.

The controller 54 of the robot 38 may generate and send signal(s) to control one or more operations of the robot 38. For instance, the controller 56 may send signal(s) to a steering control system 104 to control a direction of movement of the robot 38 and/or to a speed control system 106 to control a speed of the robot 38. For example, the steering control system 104 may include a wheel angle control system 106 that rotates to one or more wheels and/or tracks of the robot 38 may be controlled to steer the robot 38 along a desired route. By way of example, the wheel angle control system 104 may rotate front wheels/tracks, rear wheels/tracks, and/or intermediate wheels/tracks of the robot 38, either individually or in groups. In certain embodiments, a differential braking system may independently vary the braking force on each lateral side of the robot 38 to direct the robot 38 along the desired route. Similarly, a torque vectoring system may differentially apply torque from an engine to wheels and/or tracks on each lateral side of the robot 38, thereby directing the robot 38 along a desired route. While the illustrated embodiment of the steering control system 104 includes the wheel angle control system 106, it should be appreciated that alternative embodiments may include one, two, or more of these systems, among others, in any suitable combination.

In the illustrated embodiment, the speed control system 106 may include an engine output control system 110 and/or a braking control system 112. The engine output control system 110 is configured to vary the output of the engine to control the speed of the robot 38. For example, the engine output control system 110 may vary a throttle setting of the engine, a fuel/air mixture of the engine, a timing of the engine, other suitable engine parameters to control engine output, or a combination thereof. Furthermore, the braking control system 112 may adjust braking force, thereby controlling the speed of the robot 38. While the illustrated automated speed control system 106 includes the engine output control system 110 and the braking control system 129, it should be appreciated that alternative embodiments may include one of these systems, among other systems.

The robot 40 may include a mechanism to repair, replace, or otherwise maintain the asset 12, such as a manipulator, magnet, suction system, sprayer, or lubricator. In the illustrated embodiment, the robot 40 includes a manipulator arm 114, such as electronic, hydraulic, or mechanical arm. Further, robot 40 includes an effector 116, such as a clamp, a container, a handler, or the like. The manipulator arm 114 and the effector 116 may operate in conjunction with each other to maintain the asset 12. As an example, the controller 56 of the robot 40 may send signal(s) indicating instructions to control one or more motors 118 of the manipulator arm 114 and the effector 116 to control the position of the manipulator arm 114 and the effector 116 to perform the desired operation. As will be appreciated, the controller 56 may send signal(s) indicating instructions to cause the motors to move the manipulator arm 114 to a position and/or to secure a 3D printed part 119 onto a defect 121 of the asset 12.

In some embodiments, controller 50 may determine a plan that instructs the robots 36, 38, 46, and 48 to address the defect (e.g., repair, remediate, or otherwise prevent). The plan may include one or more tasks to be performed by the robots 36, 38, 46, and 48. One or more of the controllers 50, 52, 54, 56, and 58 may determine a path (e.g., distance, direction, and/or orientation) along which one or more of the robots 36, 38, 46, and 48 is moved to address the defect. For example, the controller 50 may send signal(s) to the robots 36, 38, 46, and 48 indicative of one or more tasks to spray a part of the asset, weld a part of the asset, replace a part of the asset 12 from an inventory of parts or with a 3D printed part, or the like. Upon addressing the defect (e.g., applying a patch, replacing a part, or spraying a part), the controller 50 may determine a plan that instructs the robots 36, 38, 46, and 48 to acquire data to confirm the sufficiency of the repair or preventative maintenance, e.g., indicative that the defect was addressed. For instance, the controller 50 may send signal(s) encoding or conveying instructions to control the robots 36, 38, 46, and 48 to travel along a path planned with respect to the asset 12. The controller 50 may acquire sensor data from the sensors 96, 98, and 100 indicative of one or more characteristics of the asset 12 (e.g., via the transceivers 80, 82, 84, 88). The controller 50 may then adjust the plan to monitor the addressed defect of the asset 12 by adjusting or adding one or more tasks to the plan to acquire additional data related to the asset 12. Upon acquiring data indicative of the defect being addressed, the controller 50 may then send signals to a display 130 to display data related to the asset 12, such as detected defects, potential defects, recommendations, repairs, replacement parts, or the like, to an operator. Further, in some embodiments, the robots may be monitored and/or controlled by an operator from the control system 34 via the user interface 128 (e.g., touchscreen display).

The robotic system 10 may include a 3D printer 48 that prints a 3D printed part 119. While a 3D printer is described in detail, this is meant to be an example. In certain embodiments, the 3D model may be sent to another suitable fabrication device capable of fabricating the part using additive manufacturing in which a device deposits particles to the asset or another location. For example, the particles may be deposited to a location in successive layers to create an object. The 3D printer 48 may include a gantry 120 or other structure that supports a printer head having an extruder 122 that moves across a build platform. The 3D printer 48 may also include one or more motors 124 (e.g., stepper motors) that move the extruder 122 with respect to the build platform. For example, the processor 66 may send signal(s) indicating instructions to control the one or more motors 124 and the extruder 122 to heat a source material 126 and extrude successive layers of the source material 126 to create the 3D printed part 119. As will be appreciated, there are a various types of 3D printers 48 that may print 3D printed parts in any suitable manner.

Each of the robots 36, 38, and 46 may include a collision avoidance system 148, 150, and 152, respectively. The collision avoidance systems 148, 150, and 152 may include circuitry and/or instructions (e.g., processor-executable code) to control the sensors 96, 98, and 100 and motors 102 and 118 of the robots 36, 38, and 46. For example, if an obstacle is detected while the robot 36 is traveling along a path provided by the plan, the collision avoidance system 148 on-board the robot 36 may send signals to instruct the motors 102 to control the robot 36 based on a location of the obstacle. That is, the controller 52 may determine, via the collision avoidance system 148, a path for the robot 36 to travel that avoids interacting with the obstacle while still completing the tasks assigned to the robot 36.

As mentioned above, the robotic systems 10 of FIGS. 1 and 2 are meant to be examples, and any suitable combination of robots, including as few as one robot, may be used. Further, as described in detail below, the processor 60 of the control system and/or the processor 62 of the robot 36 are used as examples, and any suitable combination of robots and/or control systems may be used. For example, some of the steps performed by the control system may be distributed and performed by the processors 62, 64, and 68 of the respective robots 36, 38, and 40.

In some embodiments, the processor 60 may determine inspection, maintenance, or repair actions to be performed by the robots 36, 38, and 40 based on the digital representation. For instance, the processor 60 may determine a time, schedule, or location at which to perform the inspection, maintenance, or repair, based on the digital representation. Further, the processor 60 may predict health of the asset by comparing the digital representation to data of other assets. That is, the processor 60 may use domain knowledge of the digital representation to predict when a defect is likely to occur on the asset 12. For instance, the processor 60 may perform an inspection based on the digital representation that indicates a prediction of a condition of the asset. As such, the processor may perform inspection or maintenance at times based on the condition of the asset, thereby reducing time spent on inspection or maintenance as compared to inspections or maintenance actions performed according to a schedule.

Figure 3:
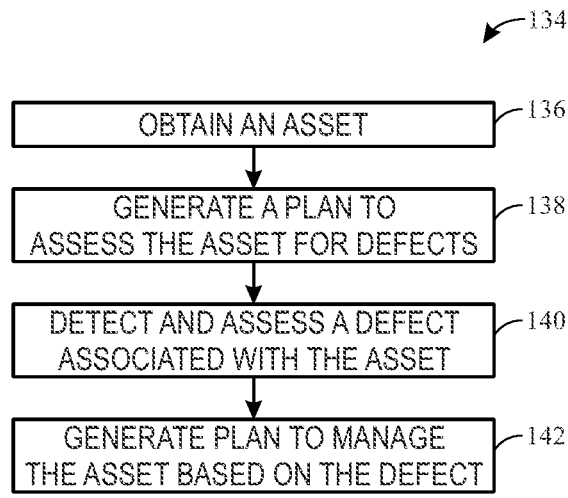
FIG. 3 is a flow diagram of a process performed by a controller of the control system of FIG. 2 to manage asset health, in accordance with aspects of the present disclosure.

FIG. 3 shows a high level flow diagram of a method 134 that the robotic system 10 may perform to manage the asset 12 to reduce or eliminate human intervention and improve the lifespan of the asset 12. At block 136, the robotic system 10 may first obtain an asset 12 for inspection. The manner in which robotic system 10 obtains the asset 12 may depend on the type of asset. For example, the robots may move to certain assets 12 (e.g., an oil pipeline, power transmission lines, etc.) to assess the asset for defects (e.g., cracks in an oil pipeline). At block 138, the processor 60 may determine a plan to assess the asset 12 for defects. As explained in detail below, the plan may include one or more tasks based on the resources (e.g., available robots) and/or the asset 12. At block 140, the robotic system may then detect and assess a defect 121 associated with the asset 12. At block 142, the robotic system 10 may manage the asset based on the defect 121. For example, the robotic system may repair and/or replace one or more parts of the asset 12 based on the severity of the defect 12. Each of blocks 138, 140, and 142 are explained below.

Figure 4:
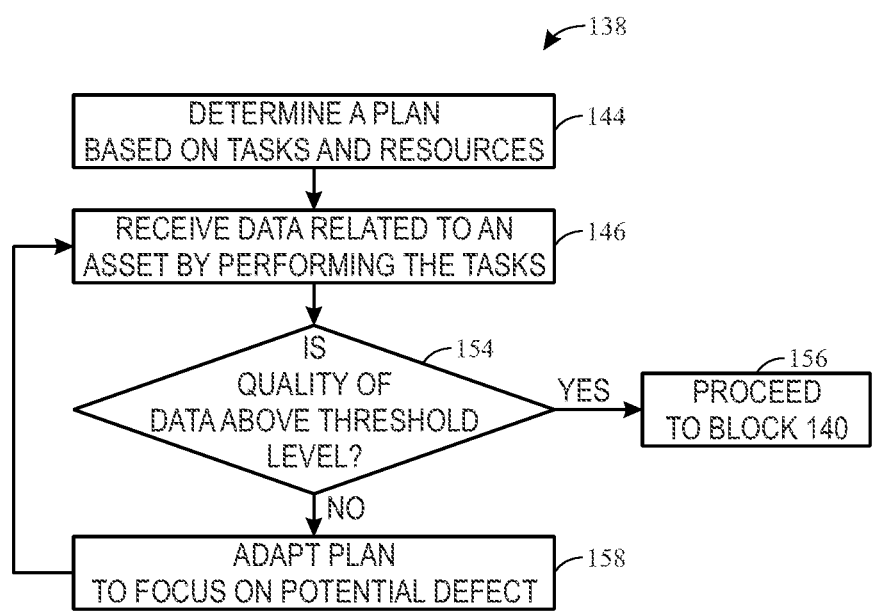
FIG. 4 is a flow diagram of a process performed by the controller when performing the process of FIG. 3, in accordance with aspects of the present disclosure.

FIG. 4 is a flow diagram of a method that may be performed at block 138 of FIG. 3 by the processor of the control system 34. At block 144, the processor 60 may plan a mission based one or more tasks and/or resources. Tasks may include instructions for one of the processors 62, 64, 66, and 68 to send signal(s) to cause the robots 36, 38, 40, and 48 to move (e.g., localize the robots 36, 38, 40, and 48 around the asset 12), to angle the robots 36, 38, and 40, to adjust settings, to wait, to capture data, or to perform any other suitable action. For example, the processors 62, 64, 66, and 68 may perform a task of movement by sending signal(s) to the motors 102, the steering control system 104, the speed control system 106, the motors 118, and the motors 124, respectively, to move the respective robot 36, 38, 40, and 48. As another example, the processors 62, 64, 66, and 68 may perform a task of acquiring data by receiving signal(s) via the sensors.

The processor 60 may generate the plan to be based on predictions derived from the digital representation or risk. For example, certain conditions may be associated with a certain level of risk. The processor 60 may control an overall objective of the robotic system 10 in a manner that manages risk. As such, in some embodiments, the processor 60 may generate the plan in a manner that maximizes availability of the asset (e.g., minimizes operation disruption) while applying economic remediation measures (e.g., to minimize cost).

Further, the processor 60 may plan the paths 22, 24, 26, and 32 of the drones 14, 16, 18, and 20, respectively, in a manner that enables the robot to provide data of the asset 12 based desired coverage of the asset, excluded areas from visibility of the asset, high risk areas of the asset 12 more likely to have defects than other areas of the asset 12, or the like. Moreover, the processor 60 may plan tasks of the robots based on a type of robot available, a type of sensor available, energy usage, or any combination thereof. For example, certain locations on the asset 12 may be difficult to inspect on the ground, and may be suitable to be inspected aerially due to the location (e.g., on top of the asset). As such, the processor 60 may assign tasks based on the location on the asset 12 to be inspected and the robot available. The processor 60 may then send signal(s) to the robots 14, 16, 18, and 20 indicating instructions to perform the tasks of the plan. The processors 62, 64, and 68 may begin by receiving the signal(s) indicating instructions to perform the tasks.

At block 146, the robots may then receive data related to the asset 12 by performing the tasks. For example, the processors 62, 64, and 68 may then send and/or signal(s) from the sensors and or effectors, as described above, to execute the tasks. The processors 62, 64, and 68 may then receive sensor data indicating one or more characteristics of the asset 12 and send the sensor data to the controller 50 of the control system 34. In some embodiments, each of the processors 62, 64, and 68 may analyze the sensor data to detect defects (e.g., defect recognition), as described in detail below, and/or to assess quality of the data.

That is, by using robots 36, 38, and 46, the processor 60 may send signal(s) to the robots 36, 38, and 46 to perform adaptive sampling in which data received from the sensors is included in the determination of the plan to adjust a manner in which later data is received to better capture data (e.g., where data is most desired). For example, data received from the robots 36, 38, and 46 may be used to adapt the plan to acquire more data related to missing information regarding the asset.

Due to a variety of reasons, the sensor data may be captured below a threshold level of quality. For example, image sensors may have smudges due to weather, deterioration, or the like. At decision block 154, each of the controllers may determine if the sensor data is above the threshold level of quality desired. For example, each of the processors 62, 64, and 68 may determine if the signal-to-noise ratio of the signals from the sensors indicates that the quality of data is above the threshold level of quality. If the quality of data being captured is below the threshold level of quality, at block 158, each of the processors 62, 64, and 68 may adapt the plan (e.g., on-the-fly) to acquire additional data (e.g., via the sensors 96, 98, and 100) related to a potential defect and/or to send signal(s) (e.g., via the antennas 82, 84, and 88) to the control system to inform an operator of the quality of data. If sufficient data has been acquired that is greater than the threshold level of quality, the process may continue to block 140, as shown at block 156.

Figure 5:
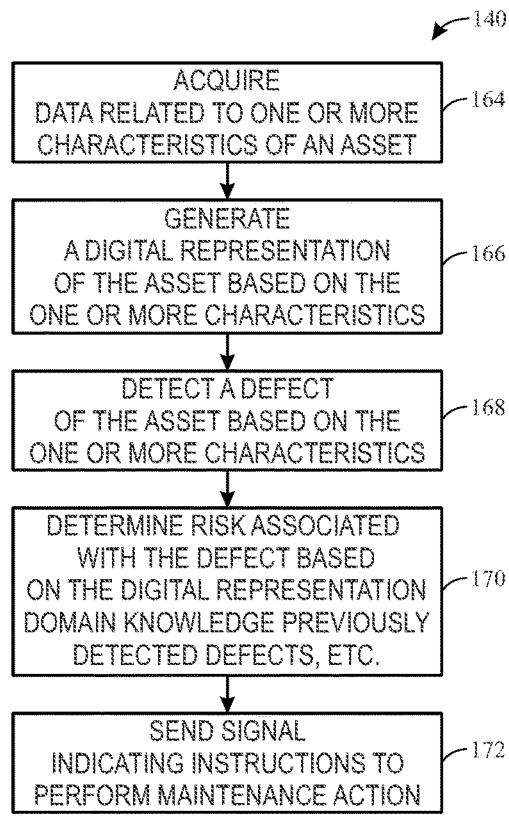
FIG. 5 is a flow diagram of another process performed by the controller when performing the process of FIG. 3, in accordance with aspects of the present disclosure.

FIG. 5 shows a process performed at block 140 by one or more of the processors 60, 62, 64, and 68 to perform automated defect recognition (ADR). Upon performing the plan described above, at block 162, each controller 52, 54, and 56 of the robots 36, 38, and 40 may acquire data related to one or more characteristics of an asset 12. As mentioned above, the data may be acquired via the respective sensors 96, 98, and 100 of the robots 36, 38, and 40. In some embodiments, the data may include environmental data from one or more environmental sensors other than the sensors 96, 98, and 100. Further, the asset 12 may include one or more sensors to provide information to the robotic system 10.

At block 166, the processor 60 of the control system 34 may receive the data from the robots 36, 38, and 40 and generate a digital representation of the asset 12 based on the one or more characteristics. That is, the data collected may be used to build, update, and maintain a digital representation of the asset 12 as described above. Additionally and/or alternatively, the processor 60 may generate the digital representation based in part on physics models and/or domain knowledge. The digital representation may include a mathematical model that has variables extrapolated from various parts of the asset 12. For example, the processor 60 may generate a digital representation that includes physical geometry of the asset 12 (e.g., gathered via the sensors 96, 98, and 100), a 3D model of the asset 12, materials of the asset 12, lifespan of the asset 12, observed or measured performance of the asset 12, or any combination thereof. In certain embodiments, each of the robots 36, 38, and 40 may, solely or collaboratively, generate a digital representation of all or part of the asset 12 based on the acquired data.

At block 168, one or more of the processors 60, 62, 64, and 68 may detect the defect 121 of the asset 12 based on the one or more characteristics. For example, the defect 121 may include a crack in the physical structure of the asset 12, corrosion on the asset 12, debris on the asset 12, material aging of the asset 12, missing parts of the asset 12, or any other suitable anomaly of the asset 12. The digital representation may include a location of the defect with respect to geometry of the asset. The processor 60 may recognize the defect 121 by comparing the one or more characteristics with prior knowledge of the asset 12 or by analysis of the digital representation against known parameters or patterns. Further, if a potential defect is detected, the controller 50 of the control system 34 may send signal(s) to the controllers 52, 54, and 56 indicating instructions to adapt the plans to acquire additional data related to the potential defect. Alternatively and/or additionally, the controller 50 may send signal(s) to the display 130 to display data related to the defect 121 to inform an operator.

At block 170, the processor 60 may determine risk associated with the defect 121 of the asset 12 based on the severity of the defect, the location of the defect, the likelihood of poor performance due to the defect, among others. Further, depending on the risk associated with the defect, the processor 60 may determine whether or not to perform a maintenance action. For example, if the processor 60 determines that a likelihood of improved performance from repairing the defect 121 of the asset 12 outweighs the cost associated with repairing the defect, then the processor 60 may send signal(s) indicating instructions to perform the maintenance action (block 172). For example, the controller 50 may send signal(s) to the 3D printer indicating instructions to print a 3D printed part, as described in detail below. In some embodiments, the maintenance actions may be related to robot fleet management. That is, the processor 60 may send signal(s) indicating instructions to inspect areas based on previously detected anomalies and the risk of the anomalies. For instance, the processor 60 may send signal(s) indicating instructions to inspect an area of the asset 12 that is prone to cracking. Similarly, a maintenance action related to robot fleet management may relate to setting or modifying an inspection interval, specifying certain types of robots and/or sensors be deployed for an inspection, acquiring operation or functional data related to asset performance that might relate to a possible or pending defect, and so forth.

Figure 6:
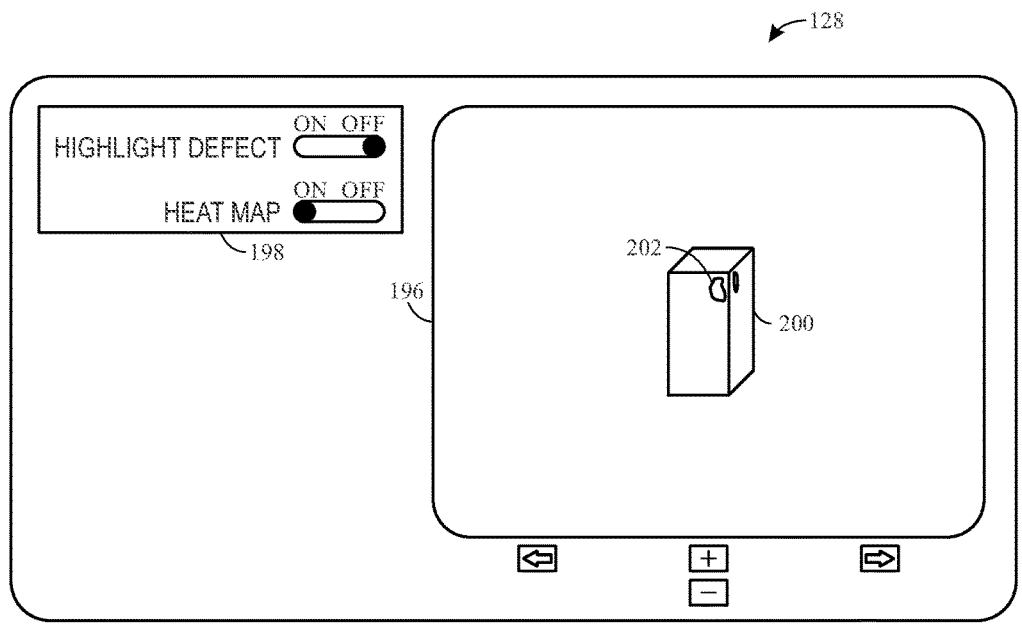
FIG. 6 is a schematic diagram of a user interface displayed to a user of the control system of FIG. 2, in accordance with aspects of the present disclosure.

Data acquired via the controllers to the asset 12 may be displayed to the user in a variety of ways. FIG. 6 shows an example of a user interface 128 displayed on the display 130 to a user of the control system 34 of FIG. 2, in accordance with aspects of the present disclosure. The user interface 128 may include a display panel 196 that displays sensor data, such as images, from the robotic system 10 (e.g., from the controllers 50, 52, 54, 56, and 58 of the robots 34, 36, 38, 46, and 48). The user interface 128 may include one or more overlays 198 that may overlay features of the data on the display panel 196. The controller 50 may receive signals (e.g., via a touchscreen, a keyboard, a mouse, etc.) indicating a selection of one or more overlays 198. The controller 50 may then send signal(s) indicating instructions to display a heat map overlaid on a model 200 of the asset 12 in the display panel 196 having heat signatures 202 from an IR sensor in an identifying color to enable the user to recognize the heat signatures 202 on the asset 12. Further, the controller 50 may receive a selection indicative of instructions to overlay recognized defects on the display panel 196 or any other overlay suitable for an operator to assess the asset 12, such corrosion, cracks, or the like.

Technical effects of the disclosure include management of health of an asset. A robotic system may plan one or more paths for robots to perform tasks to acquire characteristics of the asset. The robots may inspect the asset and receive data from sensors indicating the characteristics of the asset. A processing system of the robotic system may then detect a defect of the asset. The robotic system may then repair the asset by replacing a part, 3D printing a part, or performing another maintenance operation. For example, the processing system may create a 3D model to print to repair the asset. The processing system may send signal(s) to a 3D printer to print the 3D model. Further, the processing system may display the model of the asset on a display. In certain embodiments, the display may display one or more overlays onto the model to enable an operator to assess various characteristics of the asset, such as heat signatures.

This written description uses examples to disclose various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
generating a flight plan to monitor an asset for defects, wherein the flight plan comprises one or more tasks to be performed by at least one robot via at least one effector of the at least one robot;
executing the flight plan to acquire sensor data via at least one sensor of the at least one robot indicating one or more characteristics of the asset at a location on the asset;
determining whether a quality of the sensor data acquired at the location on the asset is below a threshold quality level and, in response to a determination that the quality of the sensor data is below the threshold quality level at the location:
dynamically adjusting the flight plan to an updated flight plan by adjusting or adding one or more tasks to the flight plan to iteratively acquire additional sensor data indicative of the one or more characteristics of the asset at the location on the asset via the at least one sensor; and
determining, after each iterative acquisition of the additional sensor data, whether the quality of the sensor data combined with the additional sensor data acquired at the location on the asset is above the threshold quality level; and
generating a signal encoding or conveying instructions to control the at least one robot to address a defect of the asset identified from the sensor data and the additional sensor data upon a determination that the quality of the sensor data combined with the additional sensor data is above the threshold quality level.

2. The method of claim 1, comprising adjusting the flight plan to monitor the asset based on detection of the defect of the asset so as to cause the at least one robot to acquire additional data related to the defect.

3. The method of claim 1, comprising generating the flight plan based on one or more of coverage of the asset, excluded areas from visibility of the asset, or high risk areas of the asset more likely to have defects than other areas of the asset.

4. The method of claim 1, comprising determining whether the quality of the sensor data is below the threshold quality level based on a signal-to-noise ratio of the sensor data.

5. The method of claim 1, comprising determining a path for the at least one robot to travel that avoids interacting with an obstacle while completing the one or more tasks assigned to the at least one robot.

6. The method of claim 1, wherein addressing the defect comprises repairing or remediating the defect by applying a part via additive manufacturing, spraying a part of the asset, welding a part of the asset, replacing a part of the asset from an available inventory of parts, or any combination thereof.

7. A non-transitory, computer readable medium comprising instructions configured to be executed by a processor of a robotic system, wherein the instructions comprise instructions configured to cause the processor to:
generate a flight plan to monitor an asset for defects, wherein the flight plan comprises one or more tasks to be performed by at least one robot via at least one effector of the at least one robot;
execute the flight plan to acquire sensor data via at least one sensor of the at least one robot indicating one or more characteristics of the asset at a location on the asset;
determine whether a quality of the sensor data acquired at the location on the asset is below a threshold quality level and, in response to a determination that the quality of the sensor data is below the threshold quality level at the location:
dynamically adjust the flight plan to an updated flight plan to iteratively acquire additional sensor data indicative of the one or more characteristics of the asset at the location on the asset via the at least one sensor; and
determine, after each iterative acquisition of the additional sensor data, whether the quality of the sensor data combined with the additional sensor data acquired at the location on the asset is above the threshold quality level; and
generate a signal, encoding or conveying, instructions to control the at least one robot to acquire sensor data related to another location on the asset upon a determination that the quality of the sensor data combined with the additional sensor data is above the threshold quality level.

8. The non-transitory computer readable medium of claim 7, wherein the instructions are configured to cause the processor to dynamically adjust the flight plan to the updated flight plan by adjusting the one or more tasks or adding one or more additional tasks to the flight plan to cause the at least one robot to acquire the additional sensor data at the location on the asset.

9. The non-transitory computer readable medium of claim 7, wherein the instructions are configured to cause the processor to determine whether the quality of the sensor data is below the threshold quality level based on a signal-to-noise ratio of the sensor data.

10. The non-transitory computer readable medium of claim 7, comprising instructions configured to cause the processor to receive resource data indicative of available resources and to plan the one or more tasks based on the available resources.

11. A robotic system configured to monitor an asset, comprising:
at least one robot comprising at least one sensor capable of detecting one or more characteristics of the asset and at least one effector capable of performing a repair or maintenance operation on the asset; and
a processing system comprising at least one processor operatively coupled to at least one memory, wherein the at least one processor is configured to:
generate a flight plan to monitor the asset, wherein the flight plan comprises one or more tasks to be performed by the at least one robot;
execute the flight plan to acquire sensor data via the at least one sensor indicating the one or more characteristics of the asset at a location on the asset;
determine whether a quality of the sensor data acquired at the location on the asset is below a threshold quality level and, in response to a determination that the quality of the sensor data is below the threshold quality level at the location:
dynamically adjust the flight plan to an updated flight plan by adjusting or adding one or more tasks to the flight plan to iteratively acquire additional sensor data indicative of the one or more characteristics of the asset at the location on the asset via the at least one sensor; and determine, after each iterative acquisition of the additional sensor data, whether the quality of the sensor data combined with the additional sensor data acquired at the location on the asset is above the threshold quality level; and operate the at least one robot to acquire sensor data related to another location on the asset upon a determination that the quality of the sensor data combined with the additional sensor data is above the threshold quality level.

12. The robotic system of claim 11, wherein the processing system is configured to send a signal to the at least one robot to adjust a path traveled by the at least one robot during execution of the flight plan to acquire additional data related to a potential defect of the asset.

13. The robotic system of claim 11, wherein the processing system is configured to determine whether the quality of the sensor data is below the threshold quality level based on a signal-to-noise ratio of the sensor data.

14. The robotic system of claim 11, wherein the flight plan comprises an initial path along which the at least one robot is to travel when executed.

15. The robotic system of claim 11, wherein the one or more tasks comprise tasks to monitor locations on the asset associated with greater risk of failure relative to other locations on the asset at one or more of an increased frequency, an increased duration, or an increased resolution or sensing quality.

16. The robotic system of claim 11, wherein the processing system is configured to receive resource data indicative of available resources and to plan the one or more tasks to be preformed by the at least one robot based on the available resources.

17. The robotic system of claim 16, wherein the available resources comprise one or more of types of robots available, types of sensors available, or energy, fuel, or power available.

18. The robotic system of claim 11, wherein the processing system is configured to send one or more signals encoding or conveying instructions to control the at least one robot to acquire additional data related to a potential defect on the asset.

* * * * *